(12) United States Patent
Biswas et al.

(10) Patent No.: US 7,146,046 B2
(45) Date of Patent: Dec. 5, 2006

(54) METHOD AND APPARATUS FOR SCALE INDEPENDENT CUSP DETECTION

(75) Inventors: Manoj K. Biswas, Bellevue, WA (US); Bodin Dresevic, Bellevue, WA (US); Michael Kallay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 829 days.

(21) Appl. No.: 10/177,606

(22) Filed: Jun. 24, 2002

(65) Prior Publication Data

US 2003/0235336 A1 Dec. 25, 2003

(51) Int. Cl.
*G06K 9/46* (2006.01)

(52) U.S. Cl. ............ 382/195; 345/179; 382/186; 382/187

(58) Field of Classification Search ............ 382/119, 382/186, 187, 198, 203, 228, 241, 195; 345/16, 345/179

See application file for complete search history.

(56) References Cited

U.S. PATENT DOCUMENTS

| | | | | |
|---|---|---|---|---|
| 5,559,897 A | * | 9/1996 | Brown et al. | 382/186 |
| 5,768,420 A | * | 6/1998 | Brown et al. | 382/203 |
| 5,875,256 A | * | 2/1999 | Brown et al. | 382/186 |
| 6,018,591 A | * | 1/2000 | Hull et al. | 382/186 |
| 6,044,174 A | * | 3/2000 | Sinden | 382/187 |
| 6,101,280 A | * | 8/2000 | Reynolds | 382/241 |
| 6,580,826 B1 | * | 6/2003 | Sinden | 382/187 |
| 6,771,266 B1 | | 8/2004 | Lui et al. | |
| 2003/0235336 A1 | * | 12/2003 | Biswas et al. | 382/195 |

* cited by examiner

*Primary Examiner*—Gregory Desire
(74) *Attorney, Agent, or Firm*—Banner & Witcoff, Ltd.

(57) ABSTRACT

An apparatus and a processor-implemented method are provided for determining a cusp within a stroke of electronic ink. Curvature at each of a plurality of points on the stroke is estimated. Based on the estimated curvature at each of the plurality of points, a neighborhood of the points where the cusp resides is identified. One of the points in the neighborhood of the points is determined to correspond to the cusp.

48 Claims, 12 Drawing Sheets

METHOD AND APPARATUS FOR SCALE INDEPENDENT CUSP DETECTION

FIELD OF THE INVENTION

The present invention relates in general to cusp detection. More specifically, the present invention relates to an apparatus and a method for detecting, in a scale-independent manner, one or more cusps of a stroke of electronic ink.

BACKGROUND OF THE INVENTION

Electronic ink is electronic markings on a display device made by a user using a device, such as an electronic stylus, or even a plastic stylus or a user's finger on a pressure-sensitive surface, to give the appearance of writing on a surface of the display device. Using electronic ink, a user may appear to draw or write in a manner similar to writing with a pen on paper.

When a user lays down electronic ink, a position of the input device is sampled at a predetermined sampling rate. At each of the samplings, a point corresponding to a position of the input device at a sampling time is entered. A stroke of electronic ink includes all the points entered during sampling times while a user, using the input device, indicates input across the display.

Cusps are the "crest" points on a curve where the curve bends considerably fast. That is, the curvature at cusps is very high. For example, in FIG. 3, 300 and 302 indicate cusps along a stroke of electronic ink. Electronic ink may be rendered by displaying a chord that passes through the sampled points. The chord may be made to approximate a curve by computing a Bézier curve, usually a third order Bezier curve, that passes close to the points along the chord. Knowing the location of cusps is particularly useful in efficient computation of the Bézier fitted curve.

When using a Bézier curve to render the electronic ink through sampled points, a cusp point will be a Bézier end point, where the continuity of a tangent direction does not apply. Because electronic ink is often rendered using a Bézier fitted curve, the accurate detection of cusps dramatically improves ink rendering. The accurate detection of cusps is also useful for recognizing characters and shapes and is useful for pattern recognition. For example, a rectangle drawn in one stroke is known to have five cusps (as initial and last point of the stroke are each counted once while on the rectangle they overlap).

In the digital domain, the cusps can be detected by the difference between tangents on the successive points of the chord. If the tangents deflect by more than a threshold, a mid-point of a cusp is reported.

An estimation of the angle of deflection between two tangent angles on consecutive points is normally done by considering three sampled points which are separated by a threshold distance, to avoid noisy estimation caused by over-sampling the points. Thus, this distance depends on the resolution of the digital domain.

In electronic inking systems, sampled stroke points come from various sources with different resolution. An example of this is strokes collected using a standard mouse as a low resolution device and from a pen with a digitizer, which is a high resolution device. Typically, these points are further transformed into a different digital domain for rendering. Thus, portions of electronic ink from different sources undergo varying transformations, making it impossible for the electronic inking system to use a constant for the threshold distance mentioned above. Due to differences in resolution from one ink input device to another, what may appear as a cusp in one system may appear as noise in another system.

SUMMARY

The present invention addresses the situation above by providing a method and an apparatus for scale independent cusp detection, such that the cusp may be accurately detected regardless of a resolution of the input device or a length of a stroke. Aspects of the invention include computing a span, which may be based on length of the stroke, a size of a bounding box, which encompasses a stroke of electronic ink, and average distance between consecutive points on the stroke. An estimated curvature determination for each point may be based on the computed span such that the determination of a mid-point of the cusp is scale independent.

In a first aspect of the invention, a processor-implemented method of determining a cusp within a stroke of electronic ink is provided. Curvature at each of a plurality of points on the stroke is estimated. Based on the estimated curvature at each of the plurality of points, a neighborhood of the points where the cusp resides is identified. One of the points in the neighborhood of the points is determined to correspond to the cusp.

In a second aspect of the invention, a machine-readable medium having processor instructions recorded thereon is provided. When the instructions on the machine-readable medium are read and executed by the processor, the processor estimates a curvature at each of a plurality of points on a stroke of electronic ink, identifies a neighborhood of the points where a cusp resides based on the estimated curvature at each of the plurality of points, and determines which one of the points in the neighborhood of the points corresponds to the cusp.

In a third aspect of the invention, an apparatus for rendering electronic ink on a display of a device is provided. The apparatus includes means for estimating a curvature at each of a plurality of points on a stroke of the electronic ink, means for identifying a neighborhood of the points where a cusp resides based on the estimated curvature at each of the plurality of the points, and means for determining which one of the points in the neighborhood of the points corresponds to the cusp.

In a fourth aspect of the invention, an apparatus for rendering electronic ink on a display of a device is provided. The apparatus includes at least one data storage device and a display for displaying the rendered electronic ink. A processor is operatively connected to the storage device(s) and the display. At least one of the data storage devices has stored thereon a set of instructions, which, when executed, configure the processor to estimate a curvature at each of a plurality of points on a stroke of the electronic ink, to identify a neighborhood of the points where a cusp resides based on the estimated curvature at each of the plurality of points, and to determine which one of the points in the neighborhood of the points corresponds to the cusp.

BRIEF DESCRIPTION OF THE DRAWINGS

The present invention is described with respect to the accompanying figures, in which like reference numerals identify like elements, and in which.

DETAILED DESCRIPTION

The following describes several embodiments of the invention. A general purpose computer, which may include an embodiment of the invention, is described.

General Purpose Computer

Figure 1:
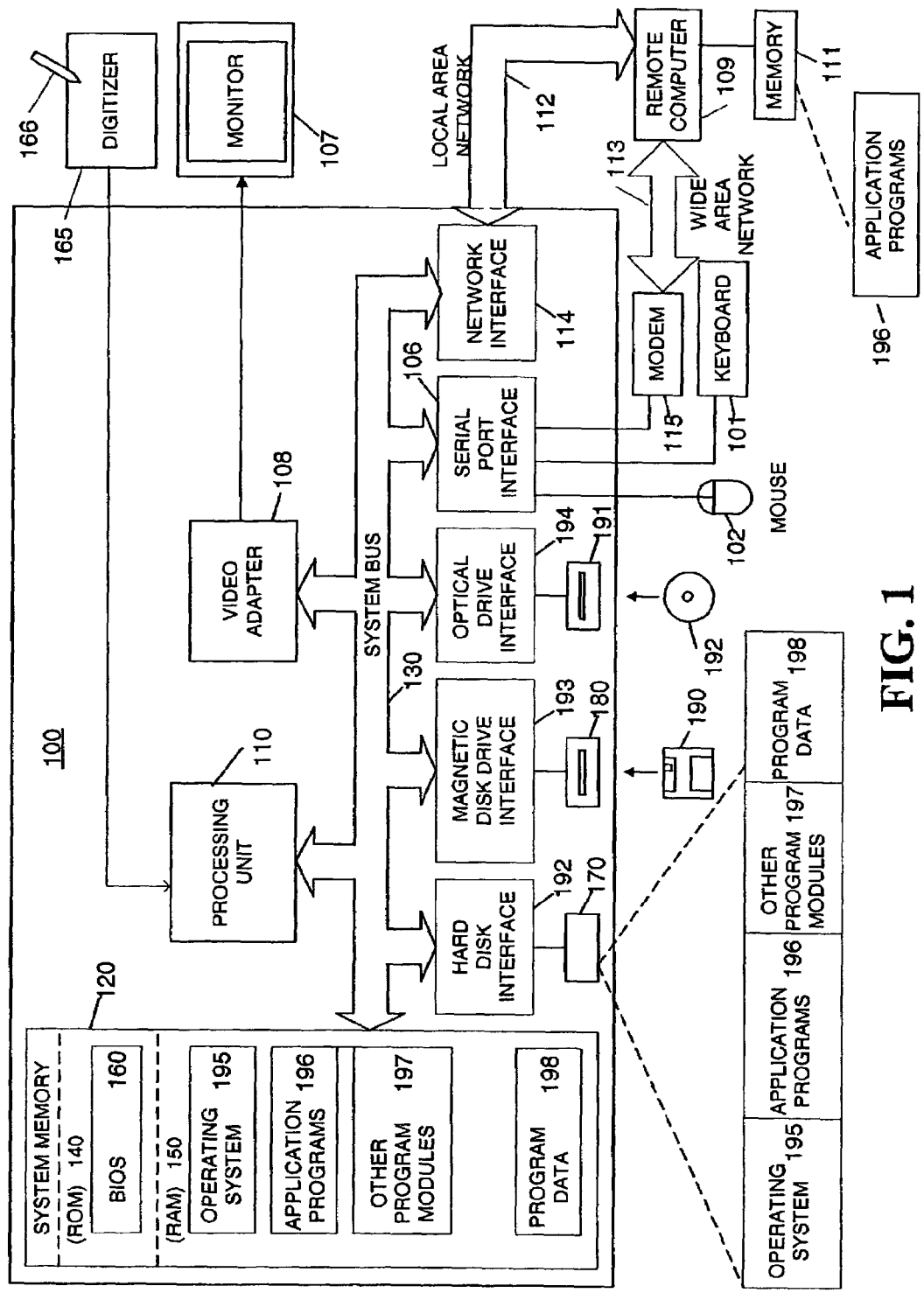
FIG. 1 is a schematic diagram of a general purpose computer that can be used to practice embodiments of the invention.

FIG. 1 illustrates a schematic diagram of an exemplary conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 15, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Portable Computing Device

Figure 2:
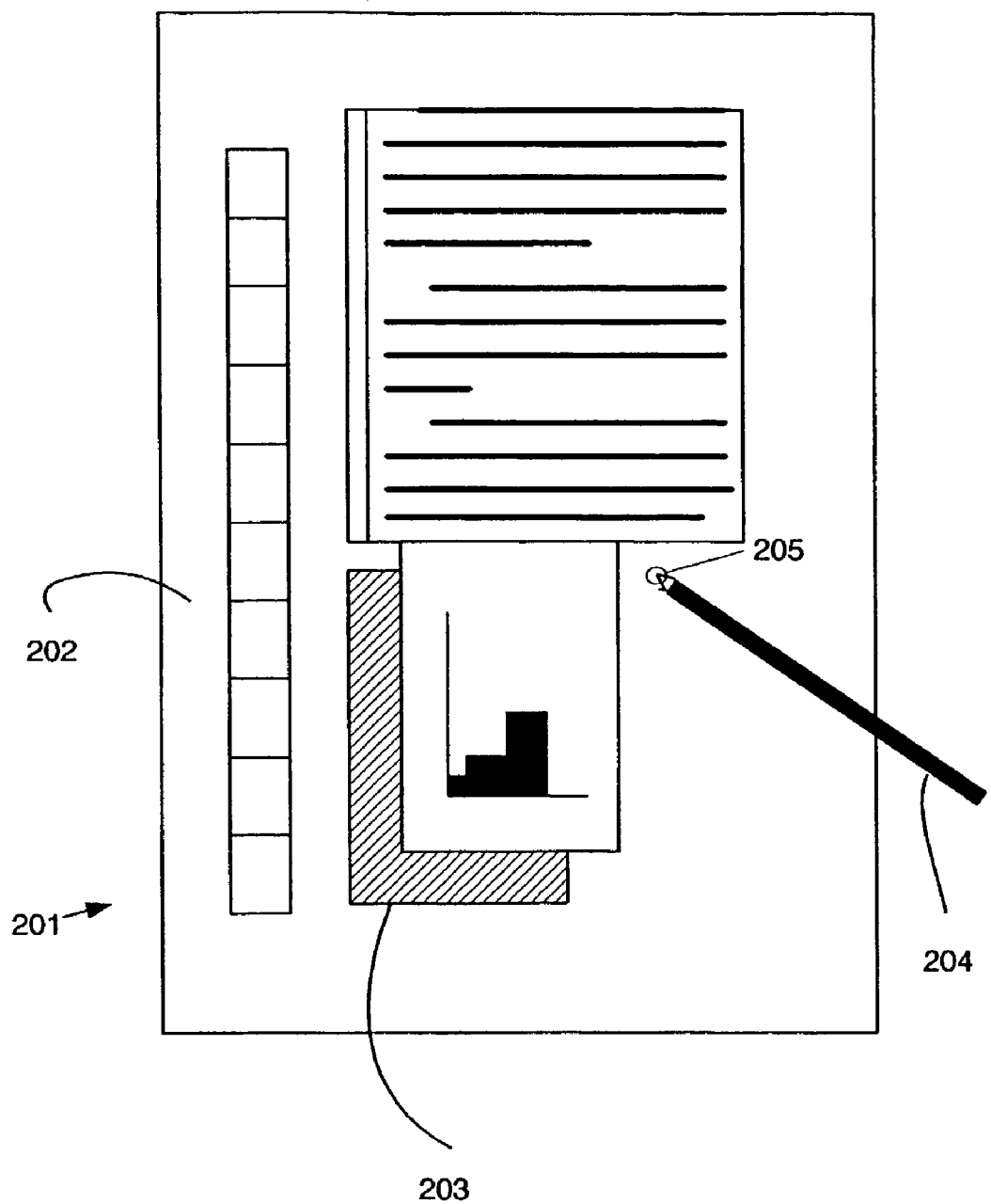
FIG. 2 diagrammatically depicts an exemplary portable computing device 201 that can be used in accordance with various aspects of the present invention.
Figure 3:
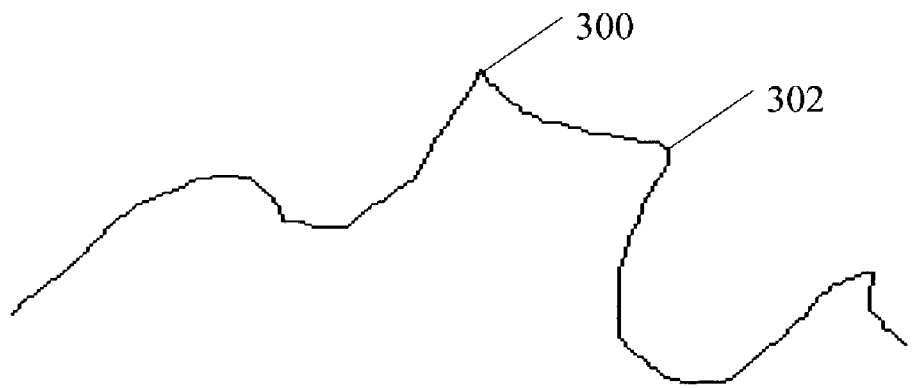
FIG. 3 illustrates an example of a stroke of electronic ink and cusps.

FIG. 2 illustrates an exemplary portable computing device 201 that can be used in accordance with various aspects of the present invention. Any or all of the features, subsystems, and functions in the system of FIG. 1 can be included in the device of FIG. 2. Portable computing device 201 may include a large display surface or screen 202, e.g., an electromagnetic or pressure-sensitive digitizing flat panel display, preferably, a liquid crystal display (LCD) screen, on which a plurality of windows 203 may be displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Portable computing device 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display that are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

Although not specifically shown, various aspects of the invention may be implemented in other devices. The devices include, but are not limited to, a Personal Digital Assistant (PDA), a laptop computer, a notebook computer, a cell phone, and video game systems.

Estimation of Curvature

Figure 4:
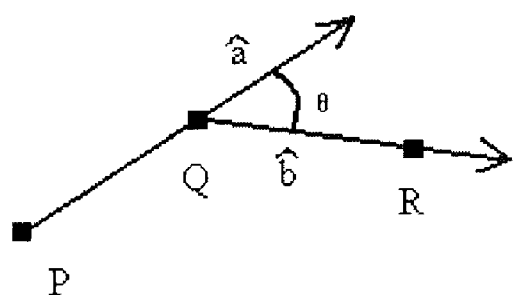
FIG. 4 shows three points of a stroke and two unit vectors formed by the points.

To identify a possible cusp, an angle between two tangents is determined. For example, FIG. 4 shows three exemplary sample points, P, Q and R along a stroke of electronic ink. The three sample points may be viewed as defining two vectors, vector a (defined by points P and Q) and vector b (defined by points Q and R). It is well known that the dot product of two vectors is equal to the product of their scalar values with the cos θ, where θ is the angle formed by the two vectors. In other words, $$a \cdot b = |a||b| \cos \theta \quad \text{(Equation 1)}$$

Thus, one can easily see that $$\theta = \cos^{-1}\left(\frac{a \cdot b}{|a||b|}\right) \quad \text{(Equation 2)}$$

However, calculation of an inverse cosine is a computationally intensive operation.

From equation 2, one can easily determine that $$\cos \theta = \left(\frac{a \cdot b}{|a||b|}\right) \quad \text{(Equation 3)}$$

Figure 5:
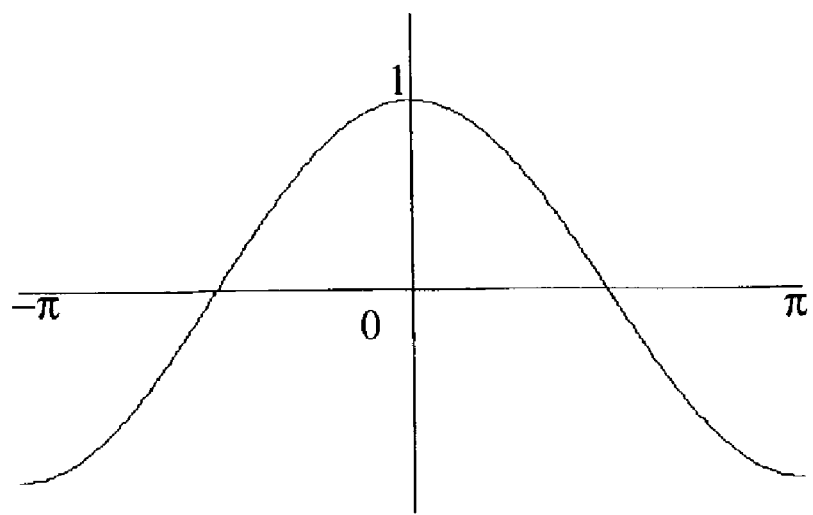
FIG. 5 graphically depicts a cosine function.

FIG. 5 shows a graph of the cosine of θ, where θ is in radians along the horizontal axis and cos θ is along the vertical axis. As one can see from the graph, cos θ is 1 when θ is 0, 0 when θ is π/2, −1 when θ is π, and 0 when θ is 3π/2.

Figure 6:
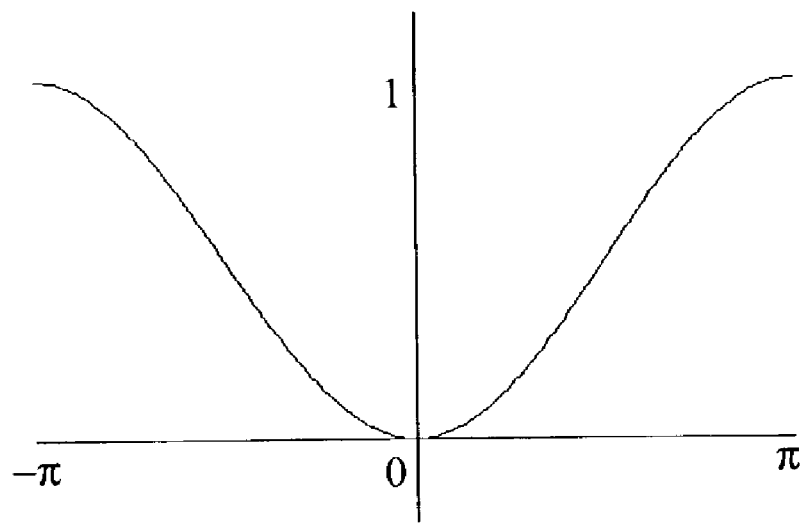
FIG. 6 graphically depicts the function (1−cos θ)

FIG. 6 shows a graph of 1−cos θ. θ is in radians along the horizontal axis and 1−cos θ is along the vertical axis. Thus, 1−cos θ is 0, when θ is 0, 1 when θ is ±π/2, and 2 when θ is ±π.

From equation 3, one can see that $$1 - \cos \theta = 1 - \left(\frac{a \cdot b}{|a||b|}\right) \quad \text{(Equation 4)}$$

In an embodiment, a vector, a, is determined by two points, such as points P and Q, where, for example, in a Cartesian coordinate system, P has coordinates $X_1$, $Y_1$, and Q has coordinates $X_2$, $Y_2$. Because a vector has magnitude and direction, the vector may be represented as originating from coordinate (0, 0), the origin. Thus, vector a may be represented as a vector originating at (0, 0) and passing through coordinates $((X_2-X_1), (Y_2-Y_1))$. Similarly, a vector, b, determined by points Q and R, where R has coordinates $(X_3, Y_3)$, can be represented as a vector originating at (0, 0) and passing through coordinates $((X_3-X_2), (Y_3-Y_2))$. The dot product of vectors a and b can be determined by $$a \cdot b = (X_2-X_1)(X_3-X_2) + (Y_2-Y_1)(Y_3-Y_2) \quad \text{(Equation 5)}$$

Thus, $$1 - \cos \theta = 1 - \left(\frac{(X_2 - X_1)(X_3 - X_2) + (Y_2 - Y_1)(Y_3 - Y_2)}{|a||b|}\right) \quad \text{(Equation 6)}$$

Because |a| can be determined by $\sqrt{(X_2-X_1)^2+(Y_2-Y_1)^2}$ and |b| can be determained by $\sqrt{(X_3-X_2)^2+(Y_3-Y_2)^2}$, then $$1 - \cos \theta = 1 - \left(\frac{(X_2 - X_1)(X_3 - X_2) + (Y_2 - Y_1)(Y_3 - Y_2)}{\left|\sqrt{(X_2 - X_1)^2(Y_2 - Y_1)^2}\right\| \sqrt{(X_3 - X_2)^2 + (Y_3 - Y_2)^2}\right|}\right) \quad \text{(Equation 7)}$$

Setting a desirable threshold for (1−cos θ) based on what angle classifies the mid-point of a cusp simplifies cusp detection considerably.

Figure 7:
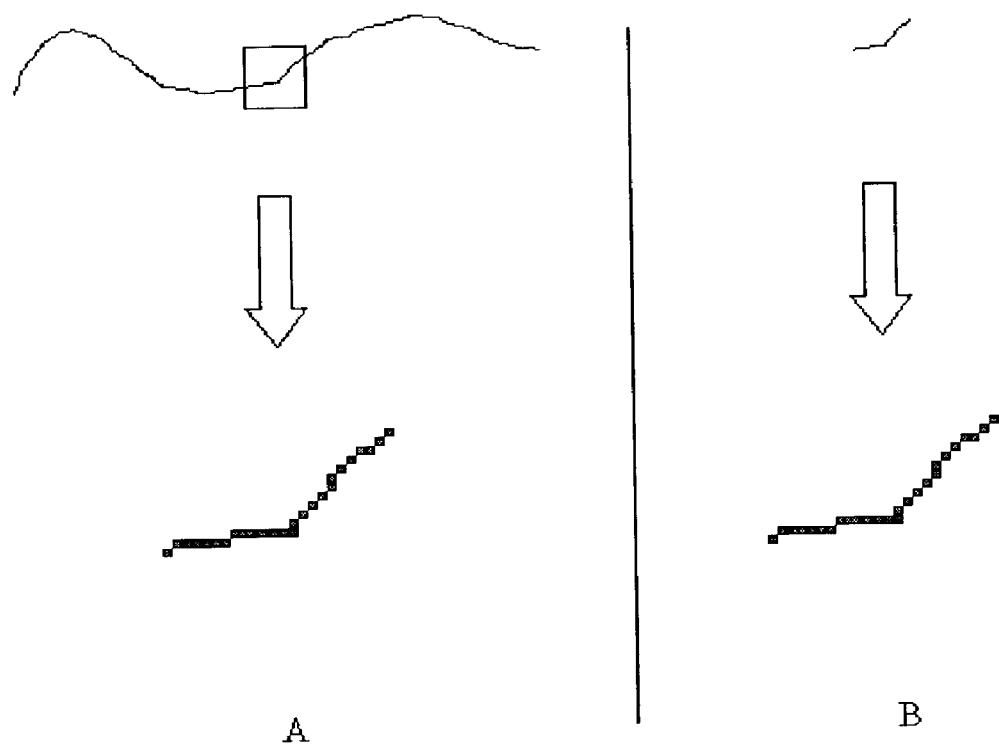
FIGS. 7A and 7B show two strokes having different lengths that were sampled at different sampling rates, wherein a cusp on one stroke may not be considered a cusp on the other stroke.

Two factors, length of a stroke and sampling rate should be considered for scale-independent cusp detection to work correctly. For example, the same set of points may be considered as a cusp if they are part of a smaller curve, but they may not be considered as the cusp if they are part of a larger curve, as illustrated in FIGS. 7A and 7B.

The sampling rate at which the points are collected to construct the curve affects the cusp detection algorithm. In FIGS. 7A and 7B, the same curve can be collected with varying sampling rate. However if cusp detection is not scale independent, the curve shown in FIG. 7B, which has points determined at a faster sampling rate than the curve shown in FIG. 7A, may report erroneous cusps. This happens because errors are introduced by inaccuracies in coordinates of points. Curvature is based on directions between points. When the points are close together (i.e., a fast sampling rate), any error in the coordinates has a greater impact on directions between points.

Span may be computed in order to make cusp detection scale independent. The span is an integer such that curvature at point P(i) may be estimated using the coordinates of points P(i-span), P(i), and P(i+span) with Equation 7. The span is related to the length of the stroke and average distance between two consecutive points on the curve (sampling rate). The curviness of the curve is a function of a minimum rectangle that encompasses the curve (bounding box) and the length of the curve. The computed span is related to these two parameters. Thus:

$$\text{span} = \text{function}(\text{length of stroke, bounding box, sampling rate}) \quad \text{(Equation 8)}$$

Figure 8:
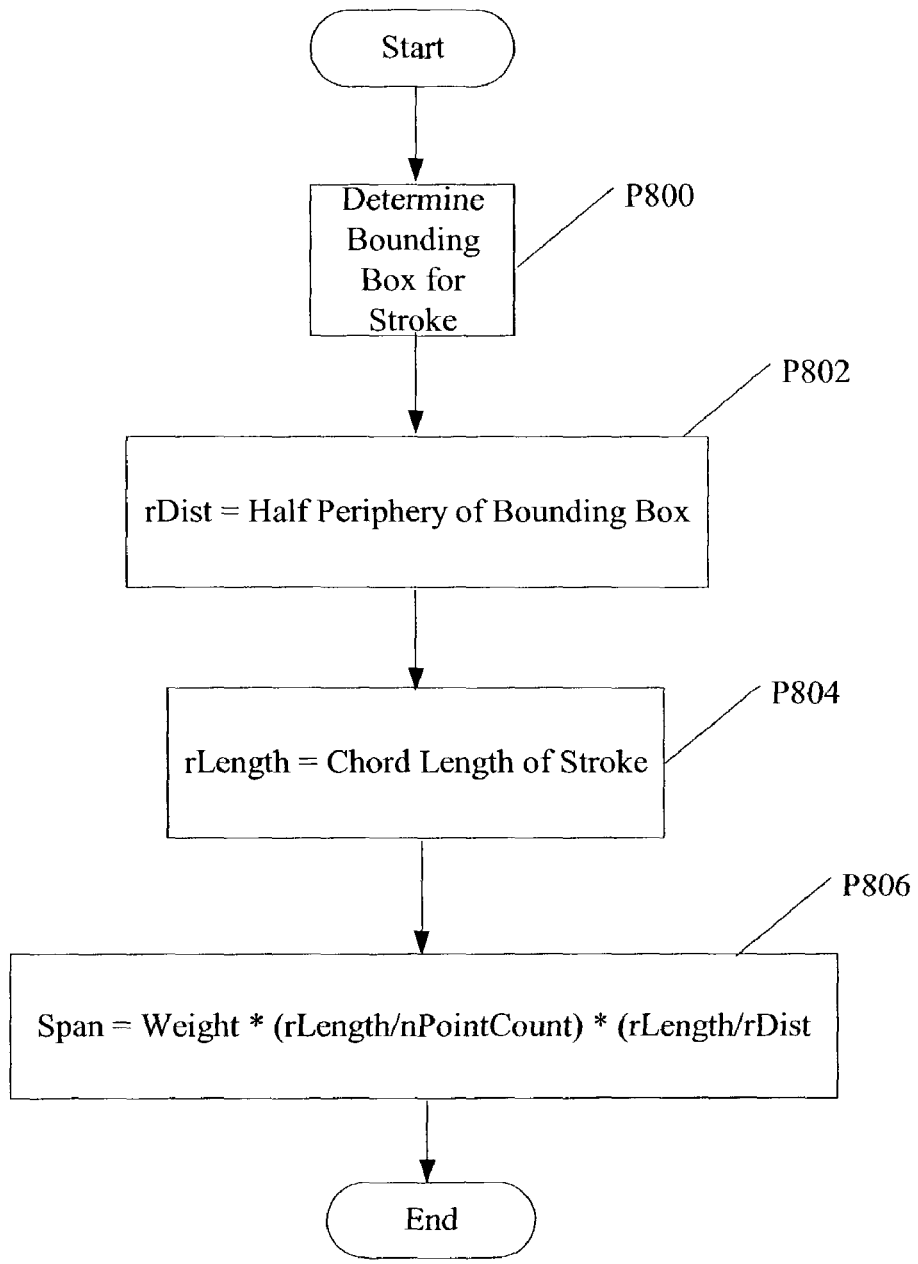
FIG. 8 is a flowchart for explaining the processing for computing a span in an exemplary embodiment of the invention.
Figure 9:
FIG. 9 is a diagram that illustrates a bounding box for a stroke of electronic ink.

FIG. 8 is a flowchart that helps to explain the processing to compute a span. At P800, a bounding box for the stroke is determined. The bounding box is the smallest rectangle that contains the stroke. FIG. 9 shows bounding box 900 of stroke 902.

Note that bounding box 900 is no higher than the highest point of stroke 902 and no wider than the width of stroke 902.

At P802, a distance, rDist, is calculated as half the periphery of the bounding box. That is, rDist=Width of Bounding Box+Height of Bounding Box.

At P804, the length of the stroke, rLength is determined. This can be determined by summing the distances between each two consecutive points within the bounding box. Thus, if points 1, 2, 3 and 4 are consecutive points within a bounding box, then the length is (distance from point 1 to point 2)+(distance from point 2 to point 3)+(distance from point 3 to point 4).

The ratio, rLength/nPointCount, where nPointCount is the number of points within the bounding box, is the average distance between consecutive points on the stroke. rLength is computed at P804.

The ratio, rLength/rDist, indicates how windy or curvy the stroke is. The higher the ratio, the more curvy or windy the stroke.

At P806, the span is computed as Weight*(rLength/nPointCount)*(rLength/rDist), rounded to an integer value. Weight has been experimentally determined and is close to 0.75.

Figure 10:
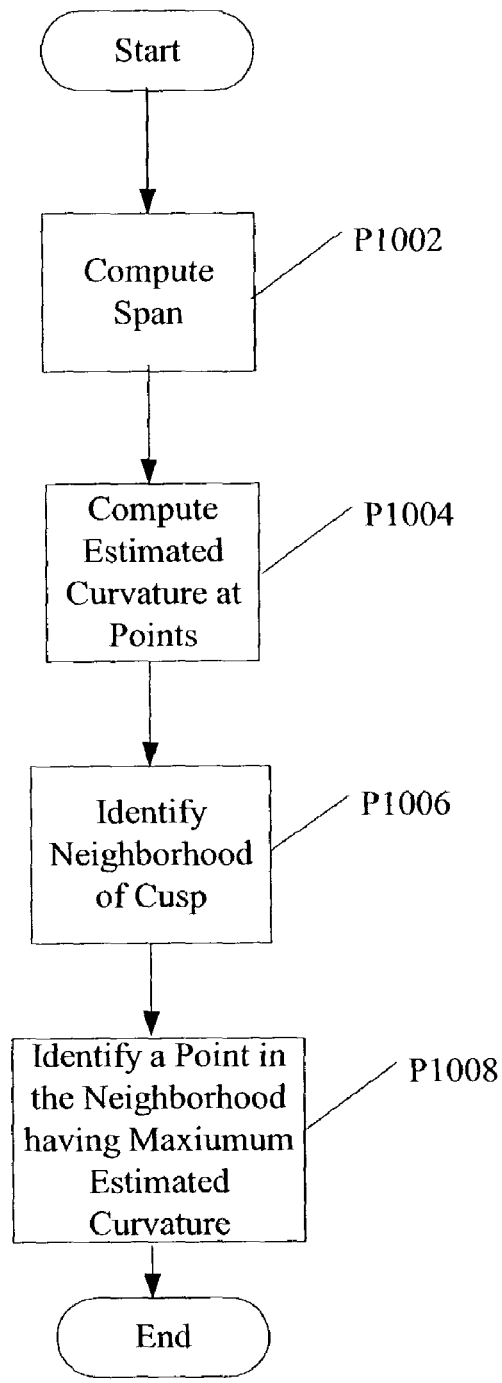
FIG. 10 is a flowchart for explaining overall processing for an exemplary embodiment of the invention.

FIG. 10 is a flowchart that illustrates the processing for scale independent cusp detection. At P1002 the span is computed as described in FIG. 8.

Figure 11:
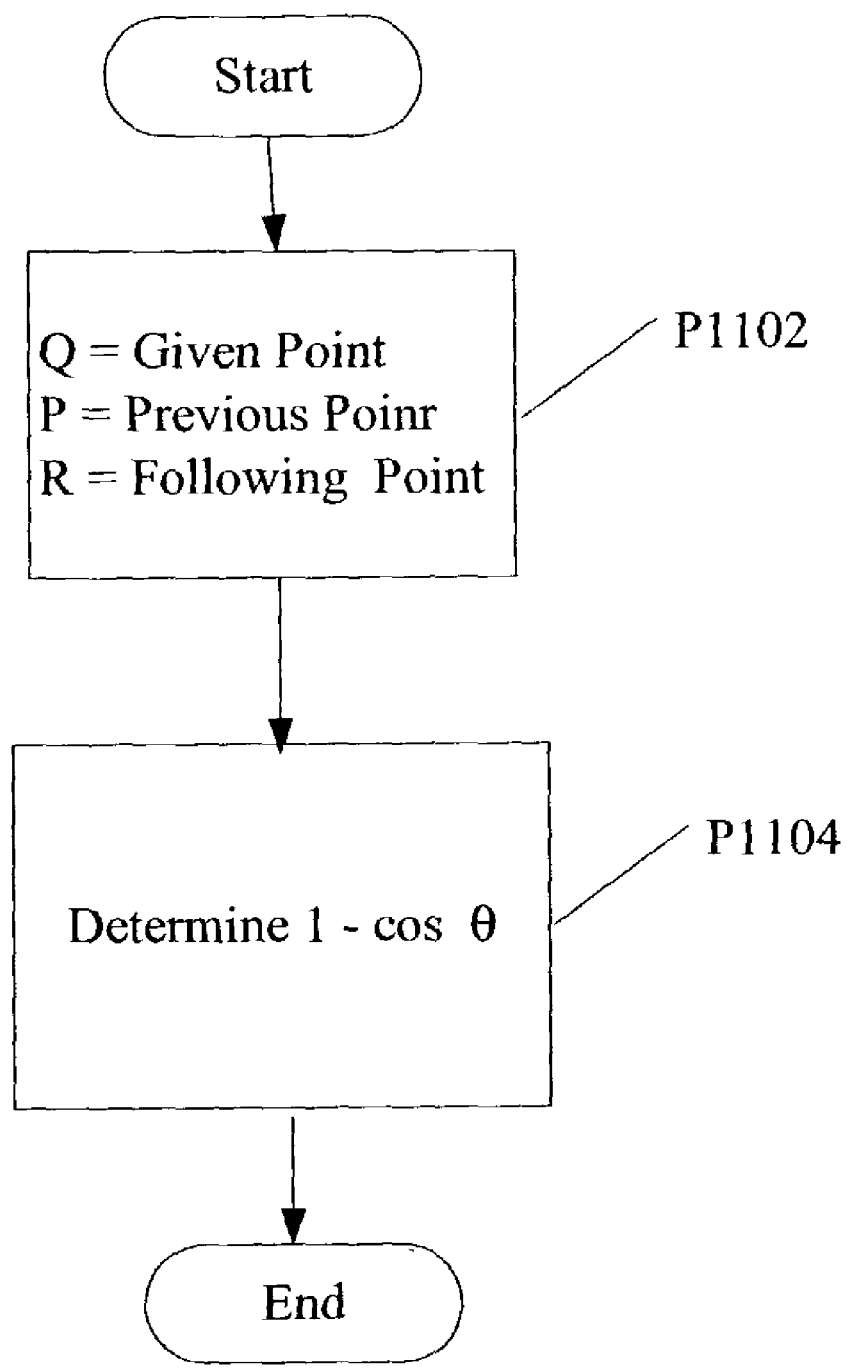
FIG. 11 is a flowchart for explaining the processing for computing estimated curvature.

At P1004, the curvature is estimated at points along the stroke as described above using equation 7. The points selected for computing the estimated curvature are based on the computed span. For example, if points 1–10 are consecutive points along a stroke and the computed span is 2, then to determine the estimated curvature at point 3, points 1, 3 and 5 will be considered. To determine the estimated curvature at point 4, points 2, 4 and 6 will be considered. To determine the estimated curvature at point 5, points 3, 5 and 7 will be considered. Once the 3 points are determined, based on the computed span, using the coordinates for the 3 points and equation 7, a value for 1−cos θ can be determined. A flowchart that explains the processing at P1004, in detail, is shown in FIG. 11.

At P1102, the 3 points for consideration are selected. That is, Q is the point at which the estimated curvature will be determined, P is a previous point and R is a following point. Points P and R are a predetermined number of points from Q, wherein the predetermined number is equal to the computed span.

At P1104, 1−cos θ, where θ is the angle between vectors formed by points P, Q and R, is determined. This can be computed by using the formula shown in equation 7 for the 3 points P, Q and R.

Figure 13:
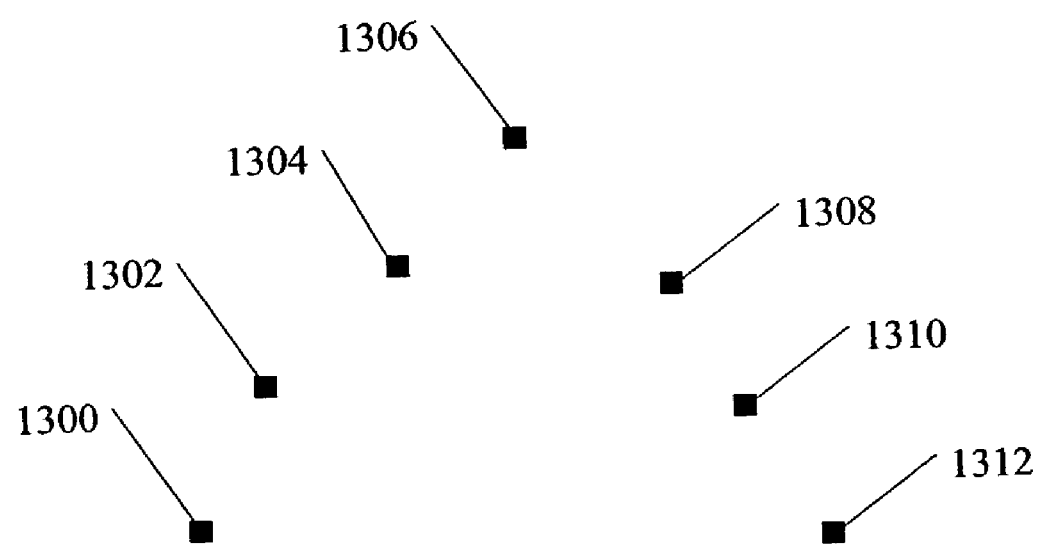
FIG. 13 shows an example of seven sampled points for explaining why several points may be included in a neighborhood of points for consideration as a mid-point of a cusp.

At P1006, a neighborhood of a cusp is determined. FIG. 13 shows an example having six sampled points 1300–1312 on a stroke, for explaining why the neighborhood of the cusp is determined. Assuming, for example, a computed span of two, the estimated curvature of point 1304 is determined by considering points 1300 and 1308, the estimated curvature of point 1306 is determined by considering points 1302 and 1310 and the estimated curvature of point 1308 is determined by considering points 1304 and 1312. Because, in this example, the computed span is greater than one, several of the points, for example, points 1304–1308 may have estimated curvatures greater than the predetermined threshold. By including such points in a neighborhood of points, the point within the neighborhood having a maximum estimated curvature will be considered as the mid-point of the cusp.

Figure 12A:
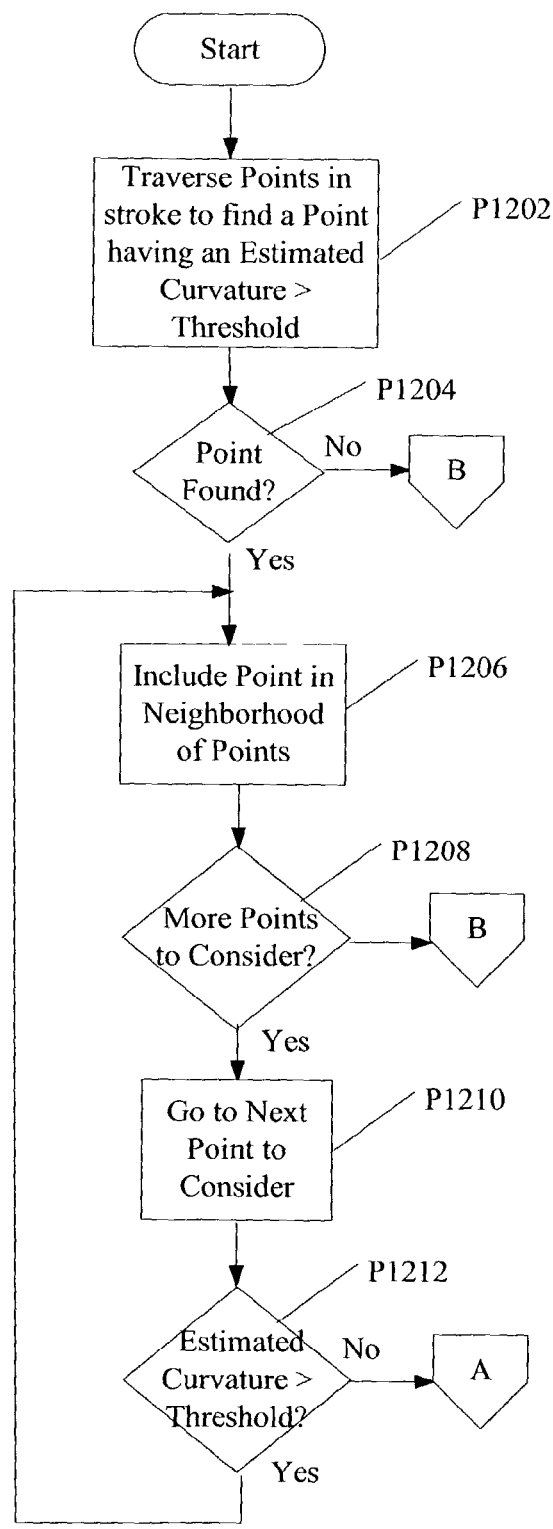
FIGS. 12A and 12B are flowcharts for explaining processing for including points in a neighborhood of a cusp and for determining the mid-point of the cusp from among the points of the neighborhood.
Figure 12B:
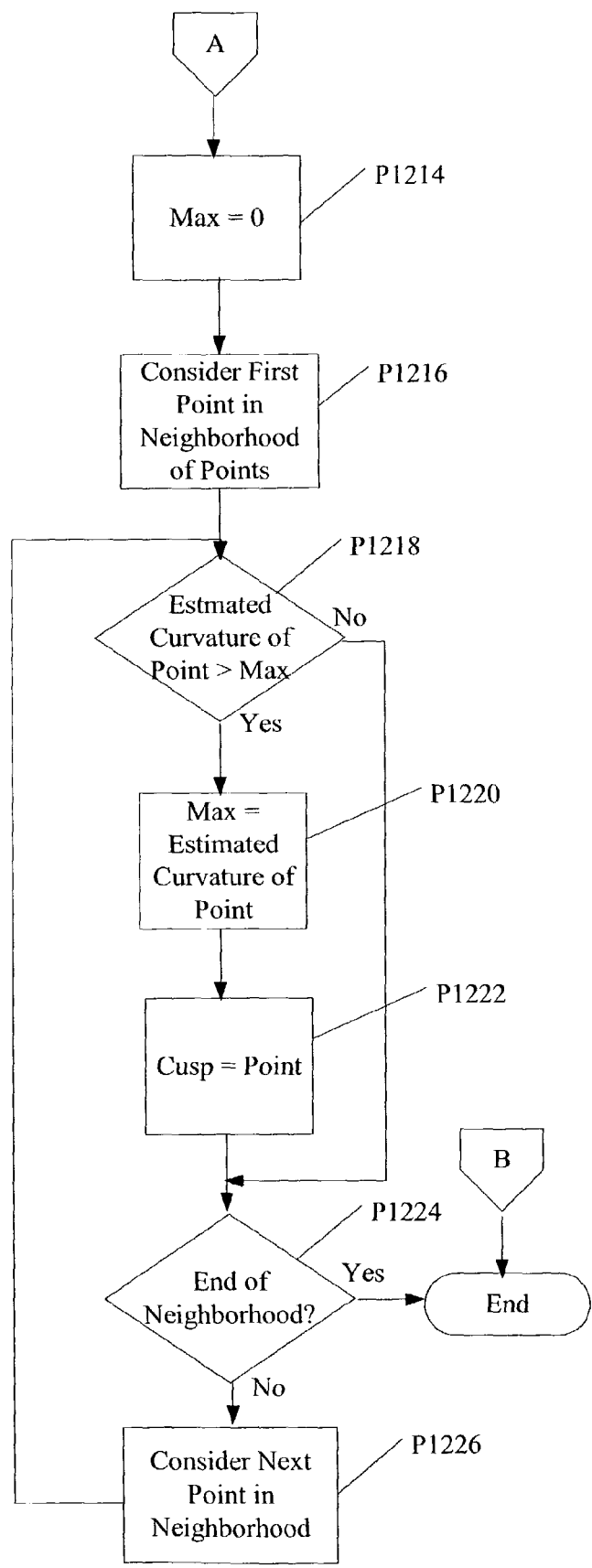

At P1008, a point in the neighborhood having a maximum estimated curvature is identified as the mid-point of the cusp. A flowchart that explains the process of identifying a neighborhood of the cusp and the mid-point of the cusp is shown in FIGS. 12A and 12B.

At P1202, the points along the stroke are traversed until a point having an estimated curvature greater than a predetermined threshold is found. The experimentally determined value for this threshold is a value close to 0.85.

Because it is possible that no points in the stroke have an estimated curvature greater than the predetermined threshold, at P1204, a check is made to determine that a point having an estimated curvature greater than the predetermined threshold is found. If no such point is found, then no neighborhood is located. Otherwise, at P1206, the point is included in the neighborhood of points.

At P1208, a check is made to determine whether there are additional points to consider. For example, if the last point on the stroke having a computed estimated curvature has already been considered, then the process is completed. Otherwise, at P1210, the next point is considered.

At P1212, the estimated curvature of the point under consideration is checked to determine whether it is greater than the predetermined threshold. If the estimated curvature is greater than the threshold, then P1206 will be performed to include the point in the neighborhood of points and P1208 will be performed to check whether more points need to be considered.

When the check at P1212 determines that the estimated curvature is not greater than the threshold, then P1214 will be performed to set a variable, Max to zero.

At P1216, the first point in the neighborhood of points will be considered.

At P1218, a check is made to determine whether the estimated curvature of the point under consideration is greater than max. If not, P1224 will be performed next to determine whether the end of the neighborhood has been reached. Otherwise, P1220 is performed to set Max equal to the estimated curvature of the point and at P1222, a variable, Cusp, is set to indicate the current point as the mid-point of the cusp.

At P1224, a check is made to determine whether the end of the neighborhood of points has been reached, and if so, the process is completed and the variable, Cusp, indicates the mid-point of the cusp. Otherwise, at P1226, the next point in the neighborhood of points is considered and processing proceeds to P1218.

Alternatively, if more than one point has the same maximum curvature value in the neighborhood, then the point closest to the middle of the neighborhood may be selected as the cusp.

Alternative methods may be used for computing the span. For example, a span may be computed adaptively, such that the span changes depending on what portion of the stroke is being processed. One method of computing the span may set the computed span for a portion of the stroke depending upon a speed at which the portion of the stroke is input. Using such a method, when points are sampled, a timestamp is also recorded providing the time at which the point was sampled. Comparing timestamps between consecutive points provides an indication of a speed that the portion of the stroke was input. Using this derived speed, a span may be computed for that portion of the stroke and the computed span may be used in determining the estimated curvature for a point in that portion of the stroke. Alternatively, if the sampled points of a stroke are all sampled at the same sampling rate, the distance between consecutive points provides an indication of the input speed.

In one exemplary embodiment, the span for points 0 and 1 may be calculated using the method previously discussed with reference to FIG. 8. The span for points 2 and beyond may be determined using a formula, such as:

Span($i$)=Span($i$−1)+alpha*(Dist($i$, $i$−1)−Dist($i$−1, $i$−2)), where $i \geq 2$ and 0<alpha<<1.

That is, the span for points 2 and beyond equals the span of the previous point plus an adjustment based on the distance between points i and i−1 and points i−1 and i−2. Alternatively, the span for point 0 and the last point may be determined using the method described with reference to FIG. 8 and the span for other points may be based on the distance between points i and i−1 and points i and i+1.

Using such alternative methods, the span is computed prior to estimating the curvature at the various points, such that the proper points can be considered when computing the estimated curvature.

Embodiments of the invention may be implemented in hardware, software, firmware or by an application specific integrated circuit (ASIC). The firmware may be in a read only memory and the software may reside on a medium, such as read only memory, random access memory, floppy disk or compact disk.

The present invention has been described in terms of preferred and exemplary embodiments thereof. Numerous other embodiments, modifications and variations within the scope and spirit of the appended claims will occur to persons of ordinary skill in the art from a review of this disclosure.

We claim as our invention:

1. In a rendering of electronic ink on a display of a device having a processor, a processor-implemented method of determining a cusp within a stroke of the electronic ink including a plurality of points, the method comprising:
    computing a span;
    estimating a curvature at each of a plurality of points on the stroke based on the computed span;
    identifying a neighborhood of the points where the cusp resides based on the estimated curvature at each of the plurality of points; and
    determining which one of the points in the neighborhood of the points corresponds to the cusp,
    wherein the estimating of the curvature at a respective one of the points is based on an angle θ formed by vectors based on the respective one of the points, a previous one of the points and a following one of the points, the previous one of the points being a number of points previous to the respective one of the points and the following one of the points being the number of points following the respective one of the points, the number being based on the computed span.

2. The method of claim 1, wherein the computed span is based on a length of the stroke, a bounding box of the stroke, and a sampling rate.

3. The method of claim 1, wherein the computed span is based on a ratio of a half periphery of a bounding box of the stroke and an average distance between consecutive ones of the points on the stroke.

4. The method of claim 1, wherein the identifying of the neighborhood of the points where the cusp resides comprises determining consecutive ones of the points having a corresponding estimated curvature being greater than a predetermined threshold.

5. The method of claim 4, wherein the predetermined threshold is 0.85.

6. The method of claim 1, wherein the determining of which one of the points in the neighborhood of the points corresponds to the cusp comprises determining which one of the points in the neighborhood of the points has a maximum estimated curvature.

7. The method of claim 1, wherein the computed span changes adaptively.

8. The method of claim 7, wherein the computed span changes adaptively based on a speed of input of a portion of the stroke.

9. In a rendering of electronic ink on a display of a device having a processor, a processor-implemented method of determining a cusp within a stroke of the electronic ink including a plurality of points, the method comprising:
    computing a span;
    estimating a curvature at each of a plurality of points on the stroke based on the computed span;
    identifying neighborhood of the points where the cusp resides based on the estimated curvature at each of the plurality of points; and
    determining which one of the points in the neighborhood of the points corresponds to the cusp,
    wherein the estimating of the curvature at a respective one of the points, is based on an angle θ formed by vectors based on the respective one of the points, a previous one of the points, and a following one of the points, the previous one of the points and the following one of the points being a closest point previous to the respective one of the points and following one of the respective points, respectively, that is at least a given distance from the respective one of the points, the given distance being based on the computed span.

10. The method of claim 9, wherein the given distance is determined based on a length of the stroke, a bounding box of the stroke and a sampling rate.

11. In a rendering of electronic ink on a display of a device having a processor, a processor-implemented method of determining a cusp within a stroke of the electronic ink including a plurality of points, the method comprising:
   computing a span;
   estimating a curvature at each of a plurality of points on the stroke based on the computed span;
   identifying a neighborhood of the points where the cusp resides based on the estimated curvature at each of the plurality of points; and
   determining which one of the points in the neighborhood corresponds to the cusp,
   wherein the estimating of the curvature at a respective one of the points of the plurality of points, is based on an angle $\theta$ formed by vectors based on the respective one of the points, a previous one of the points, and a following one of the points, the previous one of the points and the following one of the points having been sampled approximately a predetermined time period previous to the respective one of the points and following the respective one of the points, respectively, the predetermined time period being based on the computed span.

12. In a rendering of electronic ink on a display of a device having a processor, a processor-implemented method of determining a cusp within a stroke of the electronic ink including a plurality of points, the method comprising:
   computing a span;
   estimating a curvature at each of a plurality of points on the stroke based on the computed span;
   identifying a neighborhood of the points where the cusp resides based on the estimated curvature at each of the plurality of points; and
   determining which one of the points in the neighborhood of the points corresponds to the cusp,
   wherein the estimating of the curvature at a respective one of the points of the stroke comprises computing 1−cos $\theta$, where $\theta$ is an angle formed by a first vector based on a previous one of the points and the respective one of the points, and a second vector based on the respective one of the points and a following one of the points.

13. A machine-readable medium having processor instructions recorded thereon, such that when the instructions are read and executed by the processor, the processor is caused to perform:
   computing a span;
   estimating a curvature at each of a plurality of points on a stroke of electronic ink based on the computed span;
   identifying a neighborhood of the points where a cusp resides based on the estimated curvature at each of the plurality of points; and
   determining which one of the points in the neighborhood of the points corresponds to the cusp,
   wherein the estimating of the curvature at a respective one of the points is based on an angle $\theta$ formed by vectors based on the respective one of the points, a previous one of the points and a following one of the points, the previous one of the points being a number of points previous to the respective one of the points and the following one of the points being the number of points following the respective one of the points, the number being based on the computed span.

14. A machine-readable medium having processor instructions recorded thereon, such that when the instructions are read and executed by the processor, the processor is caused to perform:
   computing a span;
   estimating a curvature at each of a plurality of points on a stroke of electronic ink based on the computed span;
   identifying a neighborhood of the points where a cusp resides based on the estimated curvature at each of the plurality of points; and
   determining which one of the points in the neighborhood of the points corresponds to the cusp,
   wherein the estimating of the curvature at a respective one of the points, is based on an angle $\theta$ formed by vectors based on the respective one of the points, a previous one of the points, and a following one of the points, the previous one of the points and the following one of the points being a closest point previous to the respective one of the points and following one of the respective points, respectively, that is at least a given distance from the respective one of the points, the given distance being based on the computed span.

15. The machine-readable medium of claim 14, wherein the given distance is determined based on a length of the stroke, a bounding box of the stroke and a sampling rate.

16. The machine-readable medium of claim 14, wherein the identifying of the neighborhood of the points where the cusp resides comprises determining consecutive ones of the points having a corresponding estimated curvature being greater than a predetermined threshold.

17. The machine-readable medium of claim 16, wherein the predetermined threshold is 0.85.

18. The machine-readable medium of claim 14, wherein the determining of which one of the points in the neighborhood of the points corresponds to the cusp comprises determining which one of the points in the neighborhood of the points has a maximum estimated curvature.

19. The machine-readable medium of claim 14, wherein the computed span changes adaptively.

20. The machine-readable medium of claim 14, wherein the computed span changes adaptively based on a speed of input of a portion of the stroke.

21. The machine-readable medium of claim 14, wherein the computed span is based on a length of the stroke, a bounding box of the stroke, and a sampling rate.

22. The machine-readable medium of claim 14, wherein the computed span is based on a ratio of a half periphery of a bounding box of the stroke and an average distance between consecutive ones of the points on the stroke.

23. A machine-readable medium having processor instructions recorded thereon, such that when the instructions are read and executed by the processor, the processor is caused to perform:
   computing a span;
   estimating a curvature at each of a plurality of points on a stroke of electronic ink based on the computed span;
   identifying a neighborhood of the points where a cusp resides based on the estimated curvature at each of the plurality of points; and
   determining which one of the points in the neighborhood of the points corresponds to the cusp,
   wherein the estimating of the curvature at a respective one of the points of the plurality of points, is based on an angle $\theta$ formed by vectors based on the respective one of the points, a previous one of the points, and a following one of the points, the previous one of the points and the following one of the points having been sampled approximately a predetermined time period previous to the respective one of the points and following the respective one of the points, respectively, the predetermined time period being based on the computed span.

24. A machine-readable medium having processor instructions recorded thereon, such that when the instructions are read and executed by the processor, the processor is caused to perform:
   computing a span;
   estimating a curvature at each of a plurality of points on a stroke of electronic ink based on the computed span;
   identifying a neighborhood of the points where a cusp resides based on the estimated curvature at each of the plurality of points; and
   determining which one of the points in the neighborhood of the points corresponds to the cusp, wherein the estimating of the curvature at a respective one of the points of the stroke comprises computing $1-\cos\theta$, where $\theta$ is an angle formed by a first vector based on a previous one of the points and the respective one of the points, and a second vector based on the respective one of the points and a following one of the points.

25. An apparatus for rendering of electronic ink on a display of a device, the apparatus comprising:
   means for computing a span;
   means for estimating a curvature at each of a plurality of points on a stroke of the electronic ink based on the computed span;
   means for identifying a neighborhood of the points where the cusp resides based on the estimated curvature at each of the plurality of points; and
   means for determining which one of the points in the neighborhood of the points corresponds to the cusp,
   wherein the means for estimating the curvature is arranged to estimate the curvature at a respective one of the points based on an angle $\theta$ formed by vectors based on the respective one of the points, a previous one of the points and a following one of the points, the previous one of the points being a number of points previous to the respective one of the points and the following one of the points being the number of points following the respective one of the points, the number being based on the computed span.

26. An apparatus for rendering of electronic ink on a display of a device, the apparatus comprising:
   means for computing a span;
   means for estimating a curvature at each of a plurality of points on a stroke of the electronic ink based on the computed span;
   means for identifying a neighborhood of the points where the cusp resides based on the estimated curvature at each of the plurality of points; and
   means for determining which one of the points in the neighborhood of the points corresponds to the cusp,
   wherein the means for estimating the curvature is arranged to estimate the curvature at a respective one of the points based on an angle $\theta$ formed by vectors based on the respective one of the points, a previous one of the points, and a following one of the points, the previous one of the points and the following one of the points being a closest point previous to the respective one of the points and following one of the respective points, respectively, that is at least a given distance from the respective one of the points, the given distance being based on the computed span.

27. The apparatus of claim 26, wherein the means for computing the span is arranged to determine the given distance based on a length of the stroke, a bounding box of the stroke and a sampling rate.

28. An apparatus for rendering of electronic ink on a display of a device, the apparatus comprising:
   means for computing a span;
   means for estimating a curvature at each of a plurality of points on a stroke of the electronic ink based on the computed span;
   means for identifying a neighborhood of the points where the cusp resides based on the estimated curvature at each of the plurality of points; and
   means for determining which one of the points in the neighborhood of the points corresponds to the cusp,
   wherein the means for estimating the curvature is arranged to estimate the curvature at a respective one of the points of the plurality of points, based on an angle $\theta$ formed by vectors based on the respective one of the points, a previous one of the points, and a following one of the points, the previous one of the points and the following one of the points having been sampled approximately a predetermined time period previous to the respective one of the points and following the respective one of the points, respectively, the predetermined time period being based on the computed span.

29. The apparatus of claim 28, wherein the means for identifying the neighborhood of the points where the cusp resides is arranged to determine consecutive ones of the points having a corresponding estimated curvature being greater than a predetermined threshold.

30. The apparatus of claim 29, wherein the predetermined threshold is 0.85.

31. The apparatus of claim 28, wherein the means for determining of which one of the points in the neighborhood of the points corresponds to the cusp is arranged to determine which one of the points in the neighborhood of the points has a maximum estimated curvature.

32. The apparatus of claim 28, wherein the means for computing the span is arranged to change the span adaptively.

33. The apparatus of claim 32, wherein the means for computing the span is further arranged to adaptively change the span based on a speed of input of a portion of the stroke.

34. The apparatus of claim 28, wherein the means for computing the span is arranged to compute the span based on a length of the stroke, a bounding box of the stroke, and a sampling rate.

35. The apparatus of claim 28, wherein the means for computing the span is arranged to compute the span is based on a ratio of a half periphery of a bounding box of the stroke and an average distance between consecutive ones of the points on the stroke.

36. An apparatus for rendering of electronic ink on a display of a device, the apparatus comprising:
   means for computing a span;
   means for estimating a curvature at each of a plurality of points on a stroke of the electronic ink based on the computed span;
   means for identifying a neighborhood of the points where the cusp resides based on the estimated curvature at each of the plurality of points; and
   means for determining which one of the points in the neighborhood of the points corresponds to the cusp, wherein the means for estimating the curvature is arranged to estimate the curvature at a respective one of the points of the stroke by computing 1−cos θ, where θ is an angle formed by a first vector based on a previous one of the points and the respective one of the points, and a second vector based on the respective one of the points and a following one of the points.

37. An apparatus for rendering of electronic ink on a display, the apparatus comprising:
at least one data storage device;
a display for displaying the rendered electronc ink; and
a processor operatively connected to the storage device(s) and said display;
wherein the at least one data storage device has stored thereon on a set of instructions which, when executed, configure the processor:
to compute a span;
to estimate a curvature at each of a plurality of points on a stroke of the electronic ink is based on the computed span;
to identify a neighborhood of the points where a cusp resides based on the estimated curvature at each of the plurality of points; and
to determine which one of the points in the neighborhood of the points corresponds to the cusp,
wherein the estimating of the curvature at a respective one of the points is based on an angle θ formed by vectors based on the respective one of the points, a previous one of the points and a following one of the points, the previous one of the points being a number of points previous to the respective one of the points and the following one of the points being the number of points following the respective one of the points, the number being based on the computed span.

38. An apparatus for rendering of electronic ink on a display, the apparatus comprising:
at least one data storage device;
a display for displaying the rendered electronic ink; and
a processor operatively connected to the storage device(s) and said display;
wherein the at least one data storage device has stored thereon on a set of instructions which, when executed, configure the processor:
to compute a span;
to estimate a curvature at each of a plurality of points on a stroke of the electronic ink is based on the computed span;
to identify a neighborhood of the points where a cusp resides based on the estimated curvature at each of the plurality of points; and
to determine which one of the points in the neighborhood of the points corresponds to the cusp,
wherein the estimating of the curvature at a respective one of the points, is based on an angle θ formed by vectors based on the respective one of the points, a previous one of the points, and a following one of the points, the previous one of the points and the following one of the points being a closest point previous to the respective one of the points and following one of the respective points, respectively, that is at least a given distance from the respective one of the points, the given distance being based on the computed span.

39. The apparatus of claim 38, wherein the given distance is determined based on a length of the stroke, a bounding box of the stroke and a sampling rate.

40. An apparatus for rendering of electronic ink on a display, the apparatus comprising:
at least one data storage device;
a display for displaying the rendered electronic ink; and
a processor operatively connected to the storage device(s) and said display;
wherein the at least one data storage device has stored thereon on a set of instructions which, when executed, configure the processor:
to compute a span;
to estimate a curvature at each of a plurality of points on a stroke of the electronic ink is based on the computed span;
to identify a neighborhood of the points where a cusp resides based on the estimated curvature at each of the plurality of points; and
to determine which one of the points in the neighborhood of the points corresponds to the cusp, wherein the estimating of the curvature at a respective one of the points of the plurality of points, is based on an angle θ formed by vectors based on the respective one of the points, a previous one of the points, and a following one of the points, the previous one of the points and the following one of the points having been sampled approximately a predetermined time period previous to the respective one of the points and following the respective one of the points, respectively, the predetermined time period being based on the computed span.

41. An apparatus for rendering of electronic ink on a display, the apparatus comprising:
at least one data storage device;
a display for displaying the rendered electronc ink; and
a processor operatively connected to the storage device(s) and said display;
wherein the at least one data storage device has stored thereon a set of instructions which, when executed, configure the processor:
to compute a span;
to estimate a curvature at each of a plurality of points on a stroke of the electronic ink is based on the computed span;
to identify a neighborhood of the points where a cusp resides based on the estimated curvature at each of the plurality of points; and
to determine which one of the points in the neighborhood of the points corresponds to the cusp,
wherein the estimating of the curvature at a respective one of the points of the stroke comprises computing 1−cos θ, where θ is an angle formed by a first vector based on a previous one of the points and the respective one of the points, and a second vector based on the respective one of the points and a following one of the points.

42. The apparatus of claim 41, wherein the identifying of the neighborhood of the points where the cusp resides comprises determining consecutive ones of the points having a corresponding estimated curvature being greater than a predetermined threshold.

43. The apparatus of claim 42, wherein the predetermined threshold is 0.85.

44. The apparatus of claim 41, wherein determining which one of the points in the neighborhood of the points corresponds to the cusp comprises determining which one of the points in the neighborhood of the points has a maximum estimated curvature.

45. The apparatus of claim 41, wherein the computed span changes adaptively.

46. The apparatus of claim 45, wherein the computed span changes adaptively based on a speed of input of a portion of the stroke.

47. The apparatus of claim 41, wherein the computed span is based on a length of the stroke, a bounding box of the stroke, and a sampling rate.

48. The apparatus of claim 41, wherein the computed span is based on a ratio of a half periphery of a bounding box of the stroke and an average distance between consecutive ones of the points on the stroke.

* * * * *